United States Patent
Beaver et al.

(10) Patent No.: US 9,512,766 B2
(45) Date of Patent: Dec. 6, 2016

(54) MULTI-CELL STRUCTURE FOR AUTOMOTIVE CATALYST SUPPORT

(71) Applicant: Ford Global Technologies, LLC, Dearborn, MI (US)

(72) Inventors: Steven Michael Beaver, Novi, MI (US); Christopher Oberski, Plymouth, MI (US); David Walter Kunitz, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/030,390

(22) Filed: Sep. 18, 2013

(65) Prior Publication Data

US 2015/0047323 A1    Feb. 19, 2015

Related U.S. Application Data

(60) Provisional application No. 61/866,976, filed on Aug. 16, 2013.

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/28* | (2006.01) |
| *F01N 13/10* | (2010.01) |
| *B01D 53/94* | (2006.01) |
| *F01N 13/00* | (2010.01) |

(52) U.S. Cl.
CPC ......... *F01N 3/2803* (2013.01); *B01D 53/9454* (2013.01); *B01D 53/9477* (2013.01); *F01N 3/2828* (2013.01); *F01N 13/009* (2014.06); *F01N 13/10* (2013.01); *B01D 2255/1021* (2013.01); *B01D 2255/1023* (2013.01); *B01D 2255/2061* (2013.01); *Y02T 10/22* (2013.01)

(58) Field of Classification Search
USPC .......................... 60/299–302, 323, 324, 317
See application file for complete search history.

(56) References Cited

U.S. PATENT DOCUMENTS

| | | | | |
|---|---|---|---|---|
| 5,867,985 | A | * | 2/1999 | Furuhashi et al. ............. 60/323 |
| 6,148,613 | A | * | 11/2000 | Klopp ...................... F01N 3/20 137/625.43 |
| 6,321,531 | B1 | | 11/2001 | Caren et al. |
| 6,938,598 | B1 | | 9/2005 | Lewis et al. |
| 7,021,289 | B2 | | 4/2006 | Lewis et al. |
| 7,031,821 | B2 | | 4/2006 | Lewis et al. |
| 7,032,581 | B2 | | 4/2006 | Gibson et al. |

(Continued)

OTHER PUBLICATIONS

Anonymous, "In-situ Oxygen Concentration Measurement in the Catalyst Layer and underneath of the Catalyst Layer of the PEMFC ," IPCOM No. 000216973, Published Apr. 26, 2012, 3 pages.

(Continued)

*Primary Examiner* — Audrey K Bradley
*Assistant Examiner* — Dapinder Singh
(74) *Attorney, Agent, or Firm* — Julia Voutyras; Alleman Hall McCoy Russell & Tuttle LLP

(57) ABSTRACT

An exhaust system is described including an exhaust manifold having different length runners, with an emission control device housing a plurality of catalyst bricks, at least one of which having a multi-cell density. In this way, uneven exhaust mixing may be addressed without modifying packaging of the exhaust system.

19 Claims, 6 Drawing Sheets

(56) References Cited

U.S. PATENT DOCUMENTS

| | | |
|---|---|---|
| 7,132,621 B2 | 11/2006 | Kumar et al. |
| 7,165,391 B2 | 1/2007 | Lewis |
| 7,194,993 B2 | 3/2007 | Lewis et al. |
| 7,320,300 B2 | 1/2008 | Lewis et al. |
| 7,608,798 B2 | 10/2009 | Kumar et al. |
| 8,484,954 B2 * | 7/2013 | Knuth .............................. 60/295 |
| 2009/0151343 A1 * | 6/2009 | Son et al. ........................ 60/323 |
| 2011/0005204 A1 * | 1/2011 | Bandl-Konrad ... B01D 53/9431 60/276 |

OTHER PUBLICATIONS

Anonymous, "Increase Overall Life Long SCR Performan," IPCOM No. 000192807, Published Feb. 3, 2010, 4 pages.

* cited by examiner

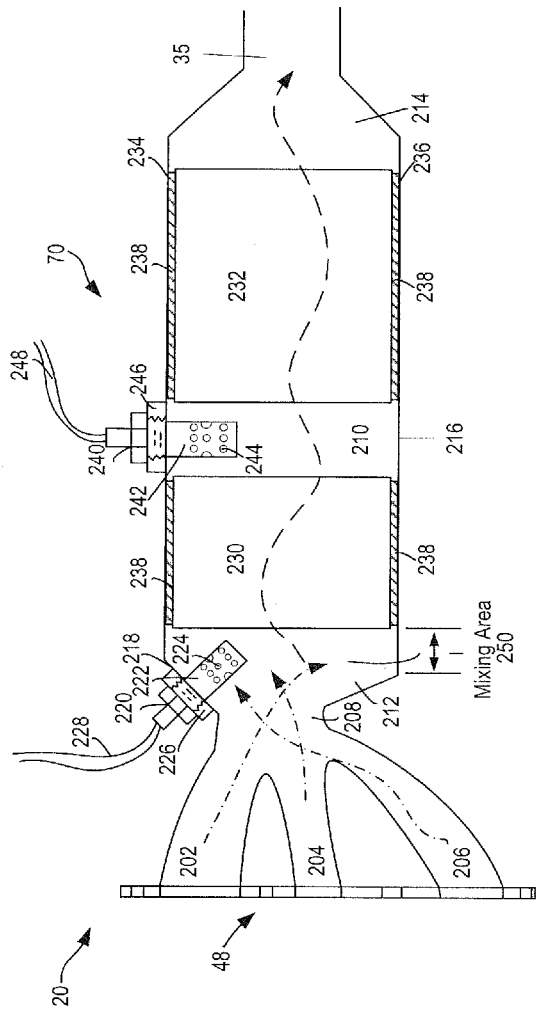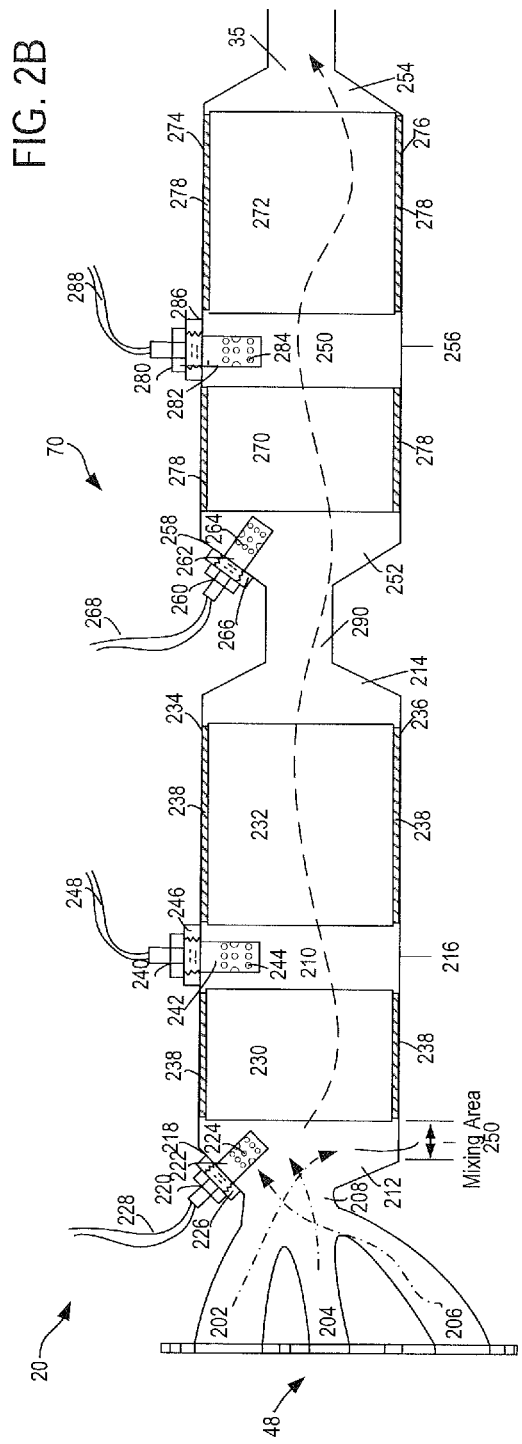

MULTI-CELL STRUCTURE FOR AUTOMOTIVE CATALYST SUPPORT

CROSS-REFERENCE TO RELATED APPLICATIONS

This application claims priority to the provisional U.S. Patent Application No. 61/866,976, filed on Aug. 16, 2013, the entire contents of which are hereby incorporated by reference for all purposes.

FIELD

The field of the application relates to exhaust systems, catalyst bricks and exhaust flow control.

BACKGROUND AND SUMMARY

Engine exhaust flow from various cylinders of the engine may be imbalanced. Specifically, the imbalances in exhaust flow can result in inhomogeneous mixing of the exhaust gas within the exhaust system. This lack of mixing can be particularly disadvantageous with respect to the efficiency and performance of close-coupled catalysts, such as three way catalysts (TWCs) or selective catalyst reduction (SCR) catalysts, as there is little space for flow blending and mixing.

While different methods have been suggested to better improve cylinder to cylinder flow mixing in the exhaust system, many of them include changing the geometry of the exhaust system, including the exhaust runner design. However, engine packaging space may require exhaust runner lengths to be unequal or in an undesired position, thus limiting the ability to modify exhaust runners as desired. Further exhaust runner design can also affect the engine exhaust tone and other NVH parameters, and thus runner design may have still further constraints limiting the ability to accommodate runner design adjustments.

The inventors herein have recognized the above constraints and their interrelationship to one another, as well as various ways to address them. For example, one approach to at least partially address the above issues includes an exhaust system with an exhaust manifold having different length runners. The exhaust system also may include an emission control device housing a catalyst brick with multi-cell density. For example, one embodiment may include multi-cell density within the first catalyst brick and a uniform cell density within the second catalyst brick. Additionally, another embodiment may include multi-cell densities in both the first and second catalyst bricks.

In this way, it is possible to improve the exhaust gas flow mixing by creating specific pressure differentials within at least one catalyst brick that work in cooperation with unequal length runners of the exhaust manifold. The pressure differential can create a more homogenous exhaust flow. In one example, the pressure differential within multiple catalyst bricks can be created by further varying the cell densities among at least two catalyst bricks within a common housing in the exhaust system. As such, improved catalyst efficiency may be obtained without requiring significant physical modifications to the exhaust system, although such modifications may also be used, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows an embodiment of an example vehicle exhaust system with an emission control device;

FIG. 2B shows an embodiment of an example vehicle exhaust system with a plurality of emission control devices

Figure 4:
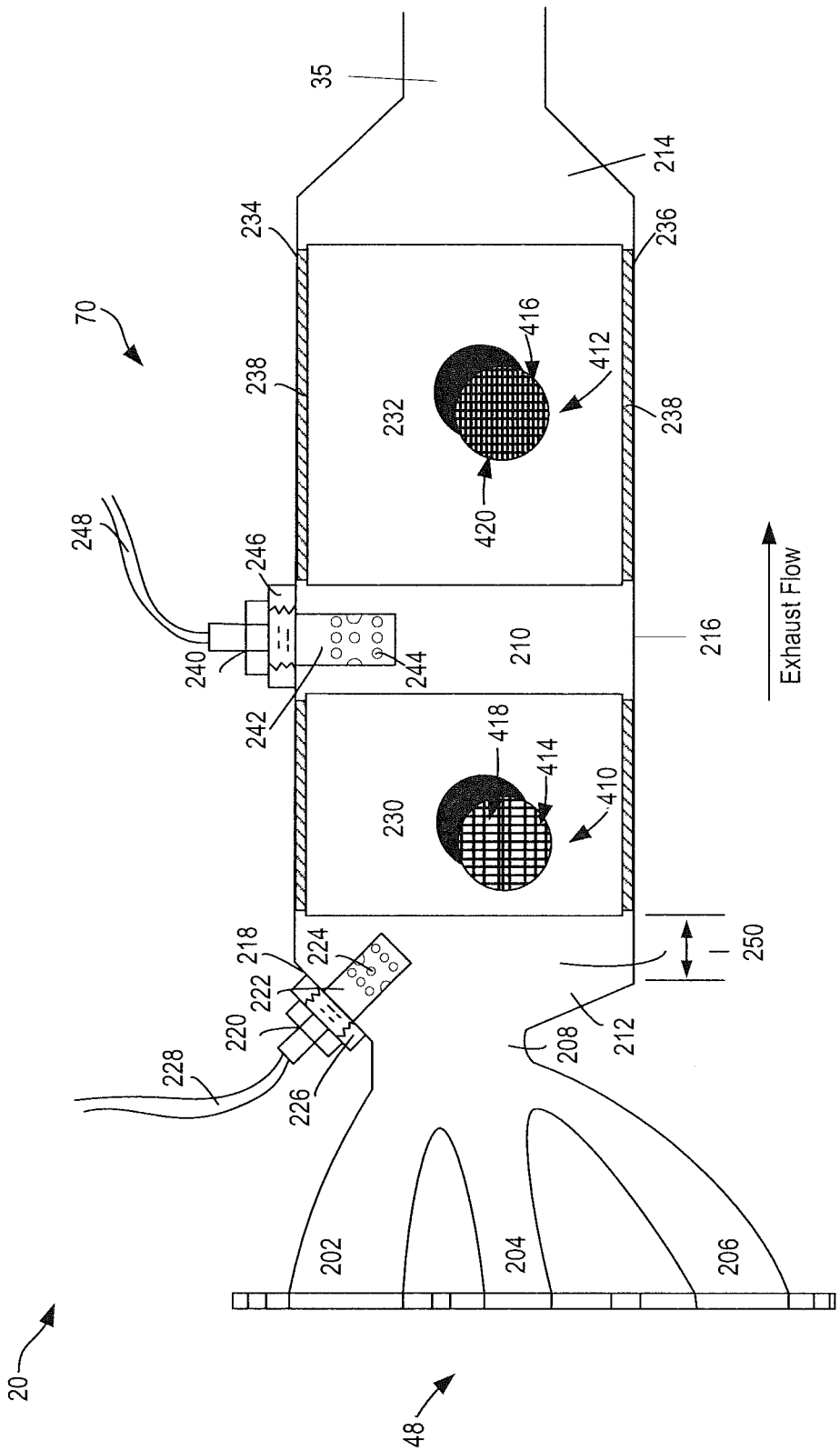
FIG. 4 shows a schematic diagram of embodiment of an emission control device housing a plurality of catalyst bricks that have multiple cell densities in one brick.
Figure 5:
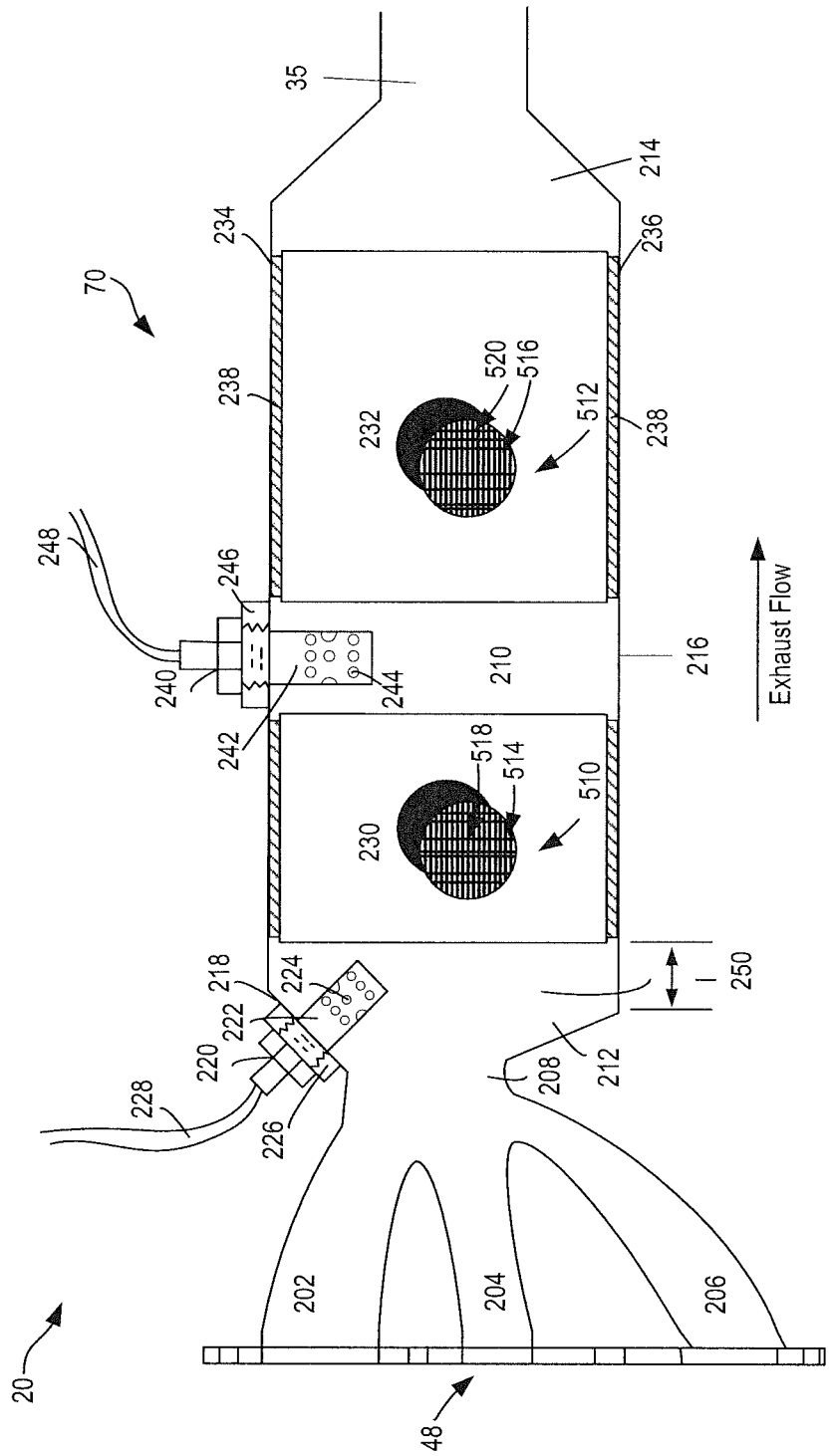
FIG. 5 shows a schematic diagram of another embodiment of an emission control device housing a plurality of catalyst bricks that have multiple cell densities in multiple bricks.
Figure 6:
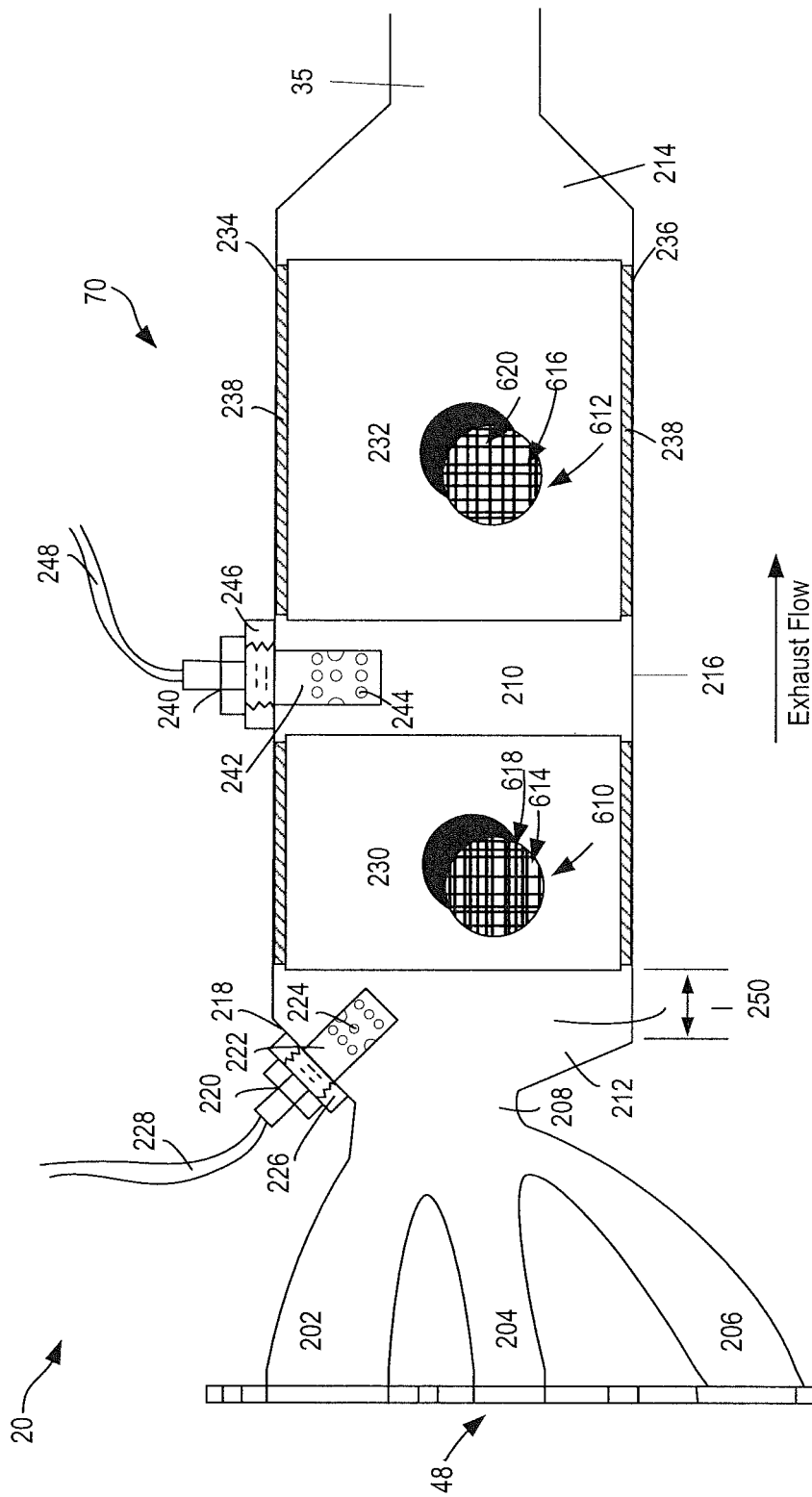
FIG. 6 shows a schematic diagram of another embodiment of an emission control device housing a plurality of catalyst bricks that have multiple cell densities in multiple bricks.

It should be noted that still further examples are possible with different cell densities and as such combinations of the features of FIGS. 4-6 are contemplated and described herein.

DETAILED DESCRIPTION

Figure 1:
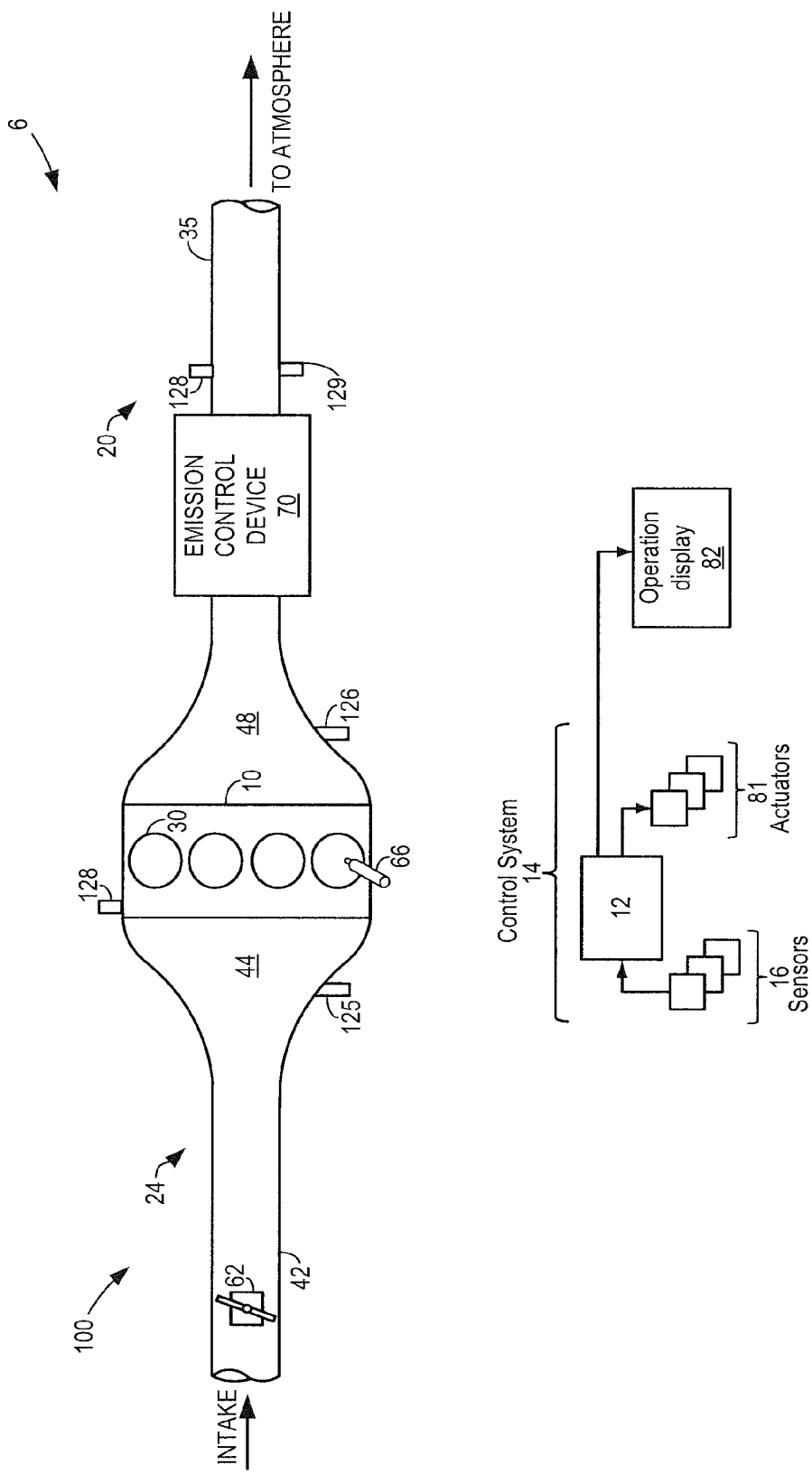
FIG. 1 shows a schematic diagram of an example vehicle engine system.

The present description is related to improving the flow and mixing of exhaust gas through a vehicle exhaust system. The vehicle exhaust system may include an engine and an exhaust manifold having different length runners converging upstream from an emission control device that houses a plurality of multi-cell density catalyst bricks, as shown in FIGS. 1-2. The flow of exhaust gas throughout the example exhaust system is illustrated in FIGS. 2A and 2B. The flow of exhaust gas is described in the method of FIG. 3. The inventors of the present application recognize that exhaust gas flow that originates from multiple exhaust runners may lead to a flow imbalance within the vehicle exhaust system. To reduce the airflow imbalance of exhaust gases entering the catalyst, a specific structure of the emission control catalyst substrates may be provided. FIGS. 4-6 illustrate various embodiments that may be used together or separately in order to improve the flow of exhaust gas and exhaust gas mixing through the emission control device and improve conversion efficiency in order to reduce emissions.

FIG. 1 shows a schematic diagram of a vehicle engine system 100. The vehicle engine system 100 includes an engine 10 having a plurality of engine cylinders 30. Engine 10 includes an air intake 24 and an exhaust system 20. Air intake 24 contains a throttle 62 coupled to the engine intake manifold 44 via an air intake passage 42. The exhaust manifold may be an integrated exhaust manifold in one example integrated into the cylinder head of the engine. The exhaust system 20 includes an exhaust manifold 48 leading to an exhaust passage 35 that routes exhaust gas to the atmosphere. The exhaust system 20 may include one or more emission control devices 70, which may be mounted in a close-coupled position to the exhaust manifold 48. Emission control devices may include, but are not limited to, a three-way catalyst, a lean $NO_x$ trap, a diesel or gasoline particulate filter, or an oxidation catalyst.

Engine 10 may receive fuel from a fuel system (not shown) including a fuel tank and one or more pumps for pressurizing fuel delivered to the fuel injectors 66 of engine 10; only a single injector 66 is shown, but additional injectors are provided for each engine cylinder present. The vehicle fuel system may be a return-less fuel system, a return fuel system, or another type of fuel system. The fuel tank may hold a plurality of fuel blends, including fuel with a range of alcohol concentrations, such as various gasoline-ethanol blends, including E10, E85, gasoline, etc., and any combination thereof.

The vehicle engine system 100 may also include a control system 14 with controller 12. Controller 12 is shown receiving information from a plurality of sensors 16 (examples of which are described herein) and sending control signals to a plurality of actuators. As one example, sensors 16 may include an exhaust gas sensor 126 (such as a linear UEGO sensor, or other exhaust sensor) located upstream of emission control device 70, temperature sensors 125 and 128, and a downstream exhaust gas sensor 129 (such as a binary HEGO sensor). Other sensors such as pressure, temperature, and composition sensors may be coupled to various locations within the vehicle engine system 100, as discussed in more detail herein. Control system 14 may receive input data from the various sensors, process the input data, and trigger the actuators in response to the processed input data based on instructions or code programmed therein corresponding to one or more routines.

Now turning to FIGS. 2A and 2B, an example vehicle exhaust system 20 that may be used in the system of FIG. 1 is illustrated. FIGS. 2A and 2B show the exhaust manifold 48 with a plurality of exhaust runners, or passages, from which the exhaust gas from the engine cylinders, such as engine cylinder 30, flows. These exhaust runners are coupled to a collection region 250 upstream of emission control device 70, followed by the exhaust passage 35.

Illustrated in FIGS. 2A and 2B, the exhaust manifold includes runners, 202, 204, and 206, that can have different lengths and widths, and converge and form a short, narrow exhaust runner convergence conduit 208. While the length is considered as the measurement along a central axis of the runner from the exhaust manifold to the center of the exhaust runner convergence conduit 208, the width may be considered the diameter of the exhaust runner at any given cross-section perpendicular to the central axis. Of the exhaust runners, one runner is longer than the other remaining two runners, and the longest runner is positioned at one end of the manifold opposite the remaining two shorter exhaust runners. In other examples, there may be a plurality of longer runners and a plurality of shorter runners. In still other examples, there may be other runner length inequalities, such as four unequal length runners, with each runner longer than the next up to the longest runner.

Illustrated in both FIGS. 2A and 2B, exhaust runner 202 is positioned near the top (in terms of the diagrammatic depiction) of exhaust manifold 48 such that it may angle down to reach the exhaust runner convergence conduit 208. Exhaust runner 202 may have the greatest width throughout the entire length of the runner, as compared to the other exhaust runners, and exhaust runner 202 may have the second longest length. The middle exhaust runner 204 may have the smallest width throughout the entire length of the exhaust runner diameter, and may be located co-axial to the exhaust runner convergence conduit 208, giving it the shortest length. The bottom exhaust runner 206 may have an intermediate width with a narrowing mouth angled upwards toward the exhaust runner convergence conduit 208. Exhaust runner 206 has the longest length in this example because of its lowered position on exhaust manifold 48 relative to the other two exhaust runners.

Another embodiment of exhaust manifold 48 may position the top exhaust runner 202 closer to the upper edge of exhaust manifold 48. Positioned here, exhaust runner 202 may have the narrowest width and the longest length. As such, exhaust runner 202 may be angled down toward the exhaust runner convergence conduit 208. The middle exhaust runner 204 may have the largest width throughout the entire length of the exhaust runner, and may be located co-axial to the exhaust runner convergence conduit 208, giving it the shortest length. The bottom exhaust runner 206 may consistently have an intermediate width through the entire length of the exhaust runner. Exhaust runner 206 may have a slightly shorter length than exhaust runner 202, based on their relative distances to the edge of exhaust manifold 48.

In another embodiment of the exhaust manifold may position the top exhaust runner 202 lower on exhaust manifold 48 such that the length of exhaust runner 202 is identical to exhaust runner 204. As such, exhaust runners 202 and 204 will both be co-axial to the exhaust runner convergence conduit 208. Exhaust runner 202 may also be wider than exhaust runner 204. The bottom exhaust runner 206 may have the widest width with the longest length, based on its relative location on exhaust manifold 48, as compared to the other two exhaust runners. Therefore, exhaust runner 206 may be angled up toward the exhaust runner convergence conduit 208.

It should be noted that the approaches described herein enable improved freedom in selection of exhaust runner length and/or width, for example unequal exhaust runner lengths. This is advantageous as the exhaust runner width and length affect an engine's performance. For example, if an exhaust runner diameter is too small, this can lead to an increase in the backpressure within the exhaust system due to insufficient exhaust gas flow. If the diameter of the exhaust runner is too large, then exhaust gas velocity may be low. This can affect the scavenging ability of the exhaust gas. Additionally, exhaust runner length also affects inertia and wave tuning, which impacts the effect scavenging has on power production.

Returning to FIGS. 2A and 2B, the emission control device 70 is shown as closely-coupled downstream from the exhaust manifold 48, with exhaust runners 202, 204, and 206, and the exhaust runner convergence conduit 208. In FIG. 2A, emission control device 70 comprises a single catalyst canister, which may be, but is not limited to, one or more of a three-way catalyst, a lean $NO_x$ trap, an SCR catalyst, a diesel or gasoline particulate filter, or an oxidation catalyst. Catalyst canister 210 contains two catalyst cones, 212 and 214, encompassing a catalyst body 216. The first catalyst cone 212 is closely coupled to the exhaust convergence conduit 208, and has two walls angled outward from the exhaust convergence conduit 208 that meet the walls of the catalyst body 216. At the far end of the catalyst body 216, the second catalyst cone 214 has walls angled inward from the catalyst body 216 to meet the walls of exhaust passage 35.

Originating at the intersection with exhaust runner convergence conduit 208, the upper angled wall 218 of the first catalyst cone 212 houses an exhaust sensor 220 such that the exhaust sensor is positioned adjacent to the one longer exhaust runner 202. This exhaust sensor may be, but is not limited to, a linear oxygen sensor or universal or wide-range exhaust gas oxygen (UEGO), two-state oxygen sensor (EGO), heated EGO (HEGO), $NO_x$, HC, or CO sensor. Exhaust sensor 220, such as the one housed in wall 218, has internal electrodes (not shown) encased within a metal shield 222. The exhaust gas flow originating from the exhaust runners flows through exhaust runner convergence conduit 208 and is detected by the electrodes of exhaust sensor 220. The exhaust flow is detected by the electrodes after it flows into metal shield 222 via openings 224 arranged longitudinally along the bottom of the metal shield 222. The sensor housing 226 situates the exhaust sensor 220 within catalyst wall 218 and couples the electrodes to the control system 14 by wires 228.

Catalyst canister 210 contains a plurality of catalyst bricks. In the preferred embodiment in FIG. 2A, two catalytic bricks 230 and 232 are shown. Between catalytic bricks 230 and 232 and the upper 234 and lower 236 walls of the catalyst body 216 are mounting mats 238, known in the prior art to be comprised of silica fibers. Catalyst bricks, such as 230 and 232, are porous supporters for metal catalysts, which increase the efficiency of cold start exhaust gas emissions conversion. Catalyst substrate materials include porous materials with high surface area, such as, but not limited to, ceramics (e.g., cordierite), minerals (e.g., alumina), or metals (e.g., stainless steel). Additionally, some embodiments of catalyst bricks include catalyst support materials, such as ceria or barium for increased stabilization. Catalyst bricks can have various configurations, including, but not limited to, monolithic honeycomb structure, spun fibers, or layered materials.

Metallic catalysts react with exhaust gas species, such as NOx, hydrocarbons, and CO in order to convert them into desirable inert gases. Materials for metal catalysts include, precious metals (e.g., palladium), mixtures of precious metals (e.g., palladium-platinum), or rare earth metals (e.g., yttrium). Catalysts may be carried on catalyst brick substrates, and may be loaded onto the catalyst brick in a variety of ways. For example, the catalyst brick may be coated with a slurry of precursor compound(s) for the metallic catalyst using wet chemical techniques. After coating of the slurry, the substrate is dried and calcined.

Within the catalyst body 216, the first catalyst brick 230 is closely-coupled to the exhaust runner convergence conduit 208 downstream from exhaust sensor 220. The second catalyst brick 232 is located minimally downstream from the first catalyst brick 230 within the catalyst body 216. While the catalytic bricks 230 and 232 are not in contact, the separation between them is large enough to accommodate an exhaust sensor 240 within upper wall 234, approximately mid-way downstream of the catalyst body 216.

Positioning the first catalyst brick such that it is closely-coupled to exhaust manifold 48, encourages the temperature of the catalyst substrate to rise quickly to the light-off temperature. When the catalyst brick reaches the light-off temperature, exhaust gas species in the exhaust gas flow are effectively converted to desirable inert gases.

An exhaust sensor, such as sensor 240, may be, but not limited to, a linear oxygen sensor or universal or wide-range exhaust gas oxygen (UEGO), two-state oxygen sensor (EGO), heated EGO (HEGO), $NO_x$, HC, or CO sensor. An exhaust sensor 240, such as the one housed in the upper wall 234, contains internal electrodes (not shown) encased within a metal shield 242. The exhaust gas flow from the first catalytic brick 230 is detected by the electrodes after flowing into the metal shield 242 via openings 244 arranged longitudinally along the bottom of the metal shield 242. The sensor housing 246 situates the exhaust sensor 240 within the catalyst body upper wall 234 of catalyst body 216, and couples the electrodes to the control system 14 by wires 248.

Catalysts and/or catalyst bricks may be positioned in any number of embodiments in order to efficiently promote the reaction of exhaust gas materials. For example, exhaust system 20 as described in FIG. 2A contains a single catalyst canister that contains a plurality of catalyst bricks. An additional embodiment may exist such that another emission control device is positioned downstream of the current emission control device. As illustrated in FIG. 2B, a second catalyst canister 250 may be positioned downstream from catalyst canister 210. As such, catalysts 210 and 250 are closely-coupled by a short exhaust pipe 290. In this manner, the emission control devices are arranged in a cascade such that heat loss is minimized between the catalyst canisters.

While catalyst canister 210 remains closely-coupled downstream from the exhaust manifold 48, exhaust runners 202, 204, and 206, and the exhaust runner convergence conduit 208, catalyst canister 250 is coupled in a downstream position, which may be an underbody position, and is coupled to the short exhaust pipe 290. Catalyst canister 250 may be, but is not limited to, a three-way catalyst, a lean $NO_x$ trap, a diesel or gasoline particulate filter, or an oxidation catalyst. Catalyst 250 contains two catalyst cones 252 and 254 encompassing a catalyst body 256. The first catalyst cone 252 is coupled to the short exhaust pipe 290 downstream from catalyst canister 210, and has two walls angled outward from exhaust pipe 290 that meet the walls of catalyst body 256. At the far end of the catalyst body 256, the second catalyst cone 254 has walls angled inward from the catalyst body 256 to meet the walls of exhaust passage 35.

Originating at the intersection with exhaust pipe 290, the upper angled wall 258 of the first catalyst cone 252 may house an exhaust sensor 260 such that the oxygen sensor is positioned upstream from a first catalyst brick. This exhaust sensor may be, but is not limited to, a linear oxygen sensor or universal or wide-range exhaust gas oxygen (UEGO), two-state oxygen sensor (EGO), heated EGO (HEGO), $NO_x$, HC, or CO sensor. An exhaust sensor 260, such as the one housed in wall 258, has internal electrodes (not shown) encased within a metal shield 262. The exhaust gas originating from the exhaust runners flow through catalyst canister 210 and exhaust pipe 290, and is detected by the electrodes of exhaust sensor 260. The exhaust flow is detected by the electrodes after it flows into the metal shield 262 via openings 264 arranged longitudinally along the bottom of the metal shield 262. The sensor housing 266 situates the exhaust sensor 260 within catalyst wall 258, and couples the electrodes to the control system 14 by wires 268.

Similar to catalyst canister 210, catalyst canister 250 also contains a plurality of catalyst bricks. While two catalytic bricks 270 and 272 are shown in FIG. 2B, additional catalyst bricks may be included within catalyst 250 (or catalyst 210) in other embodiments. For example, in one embodiment, catalyst canisters 210 and 250 could be arranged in a cascade with only one catalyst brick housed in each catalyst canister. An additional embodiment includes catalyst canisters 210 and 250 could be arranged in a cascade with three catalyst bricks housed in each canister. Additionally, other combinations of pluralities of catalyst canisters and catalyst bricks such that there is more than one total catalyst brick would pertain to the current invention.

As described above, catalyst bricks 270 and 272 are porous supporters for metal catalysts, and may be made of materials such as, but not limited to, ceramics (e.g., cordierite), minerals (e.g., alumina), or metals (e.g., stainless steel), and may carry metallic catalysts, such as, but not limited to, precious metals (e.g., palladium), or rare earth metals (e.g., yttrium).

Catalyst body 256 comprises of two catalytic bricks, 270 and 272. Between catalytic bricks 270 and 272 and the upper 274 and lower 276 of the catalyst body 256 are mounting mats 278. Within catalyst body 256, the first catalyst brick 270 is coupled to the exhaust pipe 290 downstream from exhaust sensor 260. The second catalyst brick 272 may be located minimally downstream from the first catalyst brick 270 within the catalyst body 256. While catalytic bricks 270 and 272 are not in contact, the separation between them within catalyst body 256 may be large enough to accommodate another exhaust sensor 280 within the upper wall 274, approximately mid-way downstream of the catalyst body 256.

Exhaust sensor, such as sensor 280, may be, but is not limited to, a linear oxygen sensor or universal or wide-range exhaust gas oxygen (UEGO), two-state oxygen sensor (EGO), heated EGO (HEGO), $NO_x$, HC, or CO sensor. An exhaust sensor 280, such as the one housed in upper wall 274, contains internal electrodes (not shown) encased within a metal shield 282. Exhaust gas flow exiting catalytic brick 270 is detected by the electrodes after flowing into the metal shield 282 via openings 284 arranged longitudinally along the bottom of the metal shield 282. The sensor housing 286 situates the exhaust sensor 280 within the catalyst body upper wall 274, and couples the electrodes to the control system 14 by wires 288.

Returning to FIG. 2A, catalyst bricks 230 and 232 in the proposed exhaust system 20, as will be described below, may possess a variety of sizes and parameters. A change in catalyst cell density, which is measured in cells per square inch (cpsi), can affect parameters, including, but not limited to, the geometric surface in which the catalyst resides, the mass of exhaust materials that flow through the catalyst brick, the heat transfer throughout the catalyst brick, and the resulting exhaust backpressure.

Increasing the cell density of a catalyst brick leads to an increase in the catalytically effective surface without changing the overall dimensions of the catalyst brick. The physical configurations and chemical properties of catalyst bricks are controlled as necessary for emission quality control, and are described in terms cell spacing (L) and cell wall thickness (t). The cell density (N), is defined as the number of cells per unit of cross-sectional area, and is inversely related to the cell spacing, $$N = \frac{1}{L^2} \quad (1)$$

Therefore, if the cell spacing is low, a high number of cells are positioned within the catalyst support space.

The open frontal area (OFA) is related to the amount of surface area available to interact with the flow of exhaust gas, and is a function of wall thickness (t), cell spacing (L) and cell density (N), $$OFA = N(L-t)^2 \quad (2)$$

Therefore, if the cell density (N) is high, then there is a lot of OFA with which the exhaust gas can interact.

The hydraulic diameter $(D_h)$ is related to the size of the channel within the catalyst brick through which the exhaust gas may flow, $$D_h = L - t \quad (3)$$

In designing catalysts, there is a balance between geometric surface area and the pressure differential within the catalyst brick. The pressure drop ($\Delta P$) across the catalyst brick depends on the velocity (v) of the exhaust flow and the length (l) of the catalyst brick, and density ($\rho$) of the gas flow, $$\Delta P = \frac{2f\ell\rho v^2}{G_c D_h} \quad (4)$$

where f is friction, and $G_c$ is the gravitational constant ($6.67384 \times 10^{-11}$ $m^3 kg^{-1} s^{-2}$). Therefore, in order to increase the $\Delta P$ across a catalyst brick, hydraulic diameter $(D_h)$ of a catalyst needs to be low. This in turn, can be optimized when designing a catalyst brick.

In one example, the catalyst substrates applied herein may have cell densities ranging from 100-1200 cpsi with cell walls ranging from 0.1-10 mil ($10^{-3}$-$10^{-2}$ inch). More specifically, if the cell density within the catalyst brick is different, then a pressure differential can be created, in accordance with Equation 4.

As seen in FIG. 2, the exhaust gas from exhaust runners 202, 204, and 206 converge and mix in a short, narrow conduit 208. Immediately downstream from the exhaust convergence conduit 208, the mixed exhaust gas flow enters catalyst canister 210 via catalyst cone 212. The space 250 within catalyst cone 212, immediately preceding the first catalysis brick 230, is the area that a non-uniform distribution of the exhaust gas can occur. Poor mixing of the exhaust gas in this region also leads to improper sensing of the flow originating from the engine cylinders 30. To help resolve the imbalance of exhaust flow, catalyst bricks containing multiple cell densities may be used in order to improve $\Delta P$ throughout the catalyst substrate and to, more specifically, accommodate for the insufficient mixing of exhaust gases exiting the three exhaust runners that have varying lengths. To that end, the embodiment can have an improved exhaust gas flow balance within the exhaust system to compensate for the variety of lengths and widths of the exhaust runners by utilizing multiple cell densities with in a catalyst brick relative to the percent difference in length between the longest and shortest exhaust runner of the exhaust manifold (as further described below).

Figure 3:
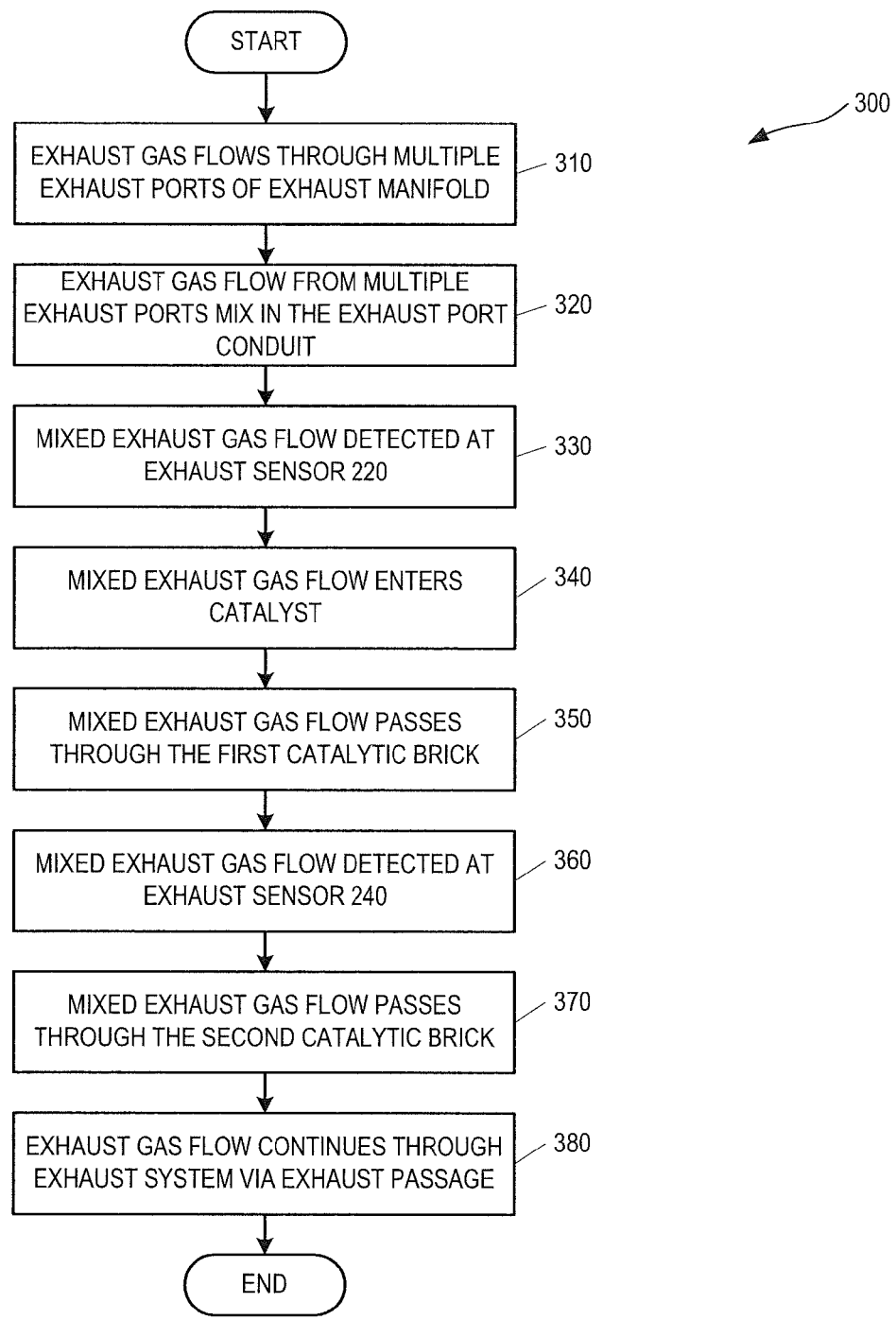
FIG. 3 shows a flowchart of the exhaust flow process according to one example embodiment.

The flowchart 300 presented in FIG. 3 describes the movement of exhaust gas through exhaust system 20. The process 310 starts as the exhaust gas flows through multiple exhaust runners 202, 204, and 206 of exhaust manifold 48. The exhaust gas flow from exhaust runners 202, 204, and 206 mix in the exhaust runner convergence conduit 208, according to 320. In 330, exhaust sensor 220 detects the mixed gas flow. At 340, the mixed exhaust gas flow enters catalyst canister 210, and at 350 passes through the first catalyst brick 230. The exhaust gas flow is detected 360 by the exhaust sensor 240 before moving through the second catalyst brick 232, according to 370. After passing through the second catalyst brick 232, the exhaust gas continues through the exhaust system 20 via the exhaust passage 35, in accordance with 380.

FIGS. 4-6 illustrate embodiments of the catalyst bricks 230 and 232 having varying cell density within a brick in various ways in order to create a pressure differential between the mixing area 250 for exhaust gas emanating from the exhaust runners of different lengths and exhaust passage 35.

FIG. 4 illustrates an embodiment for increasing the pressure differential within catalyst canister 210. Catalyst bricks 230 and 232, as illustrated, show catalyst brick 230 being shorter in length than catalyst brick 232, but other relative lengths may be used. For example, catalyst brick 230 can have the same length as catalyst brick 232. Additionally, catalyst brick 230 can be longer than catalyst brick 232.

Illustrations of axial views 410 and 412 of the cells within catalyst bricks 230 and 232, respectively, are shown in FIG. 4. The lines 414 and 416 within the axial views represent the cell walls that support the metal catalysts within the catalyst bricks. The number of black lines 414 and 416 correspond to the number of cells, and is related to the cell density of the catalyst brick (e.g., more black lines per distance signifies higher cell density). The white space 418 and 420 within the axial views represent the channels within the catalyst bricks, through which the exhaust gas will flow.

Because the number of horizontal lines per distance of 414 in catalyst brick 230 and 416 in catalyst brick 232 vary, the axial views 410 and 412 illustrate that both catalyst bricks 230 and 232 have a multi-cell density structure in the vertical direction. Additionally, the distance between the vertical lines 414 and 416 in catalyst bricks 230 and 232, respectively, do not vary for a given distance, the axial views 410 and 412 illustrate that catalyst bricks 230 and 232 have a non-uniform cell density structure in the vertical direction. Further, the cell densities vary within brick 230 differently than within brick 232, and further the variation in cell density occurs at different vertical locations within brick 230 than within brick 232. For example, there is a larger variation in cell density within a vertical center region in brick 230 than brick 232, while there is a larger variation in cell density within a vertical bottom region in brick 232 than brick 230.

In this way, a first catalyst brick in the housing has a first multi-cell density and a second catalyst brick in the housing as a second, different, multi-cell density. The difference may be a difference in a position of the varying cell density. For example, brick 230 may position adjacent cells with varying density at a first radial position, whereas brick 232 may position adjacent cells with varying density at a second radial position. Further, the degree to which neighboring cells vary in size (e.g., height, width, and/or height and width) may differ between brick 230 and brick 232. In one example, brick 230 may position cells with varying size adjacent one another on a side of exhaust flow closest to a particular runner, such as a longest runner or a shortest runner, while positioning cells of uniform size adjacent one another on an opposite side of exhaust flow.

While this example shows varying cell density in the vertical direction for each of the bricks 230 and 232, the variation may alternatively be along the length of a given brick. In another example, brick 230 may have a varying cell density as shown, while brick 232 has a uniform cell density.

An example construction of the embodiment illustrated in FIG. 4 such that a pressure differential across the catalyst canister 210 may comprise the ratio of the longest exhaust runner to the shortest exhaust runner equaling 1.6. As such, the average cell density of catalyst brick 230 may be at least 1.6 times more than the cell density of catalyst brick 232. For example, brick 230 may have an average cell density of 640 cpsi, and catalyst brick 232 may have a uniform cell density of 400 cpsi.

FIG. 5 illustrates another example for increasing the pressure differential within catalyst canister 210. Illustrations of axial views 510 and 512 of the cells within the catalyst bricks 230 and 232, respectively, are shown in FIG. 5. The lines 514 and 516 within the axial views represent the cell walls that support the metal catalysts within the catalyst bricks. The number of lines 514 and 516 correspond to the number of cells, and is related to the cell density of the catalyst bricks (e.g., more black lines per distance signifies higher cell density). The white space 518 and 520 within the axial views represent the channels within the catalyst bricks, through which the exhaust gas will flow.

Axial views 510 and 512 illustrate an approach where the distance between vertical lines varies within a brick, but the distance between horizontal lines does not. In this way, each brick has a varying cell density along the horizontal direction across the face of the brick. Further, again the cell densities may vary within brick 230 differently than within brick 232, and further the variation in cell density may occur at different horizontal locations within brick 230 than within brick 232. For example, higher cell density may be provided in a horizontal center region in brick 230 than brick 232, while a lower cell density may be provided in a horizontal side region in brick 232 than brick 230. In this example, the average cell density of both bricks 230 and 232 may be substantially equal, such as within 5% of each other.

FIG. 6 illustrates still another example for controlling the pressure differential within catalyst canister 210. Illustrations of axial views 610 and 612 of the cells within the catalyst bricks 230 and 232, respectively, are shown in FIG. 6. The lines 614 and 616 within the axial views represent the cells that support the metal catalysts within the catalyst bricks. The number of lines 614 and 616 correspond to the number of cells, and is related to the cell density of the catalyst bricks (e.g., more black lines per distance signifies higher cell density). The white space 618 and 620 within the axial views represent the channels within the catalyst bricks, through which the exhaust gas will flow.

Axial views 610 and 612 illustrate varying cell density in both the horizontal and vertical directions, in each of bricks 230 and 232.

Thus, the system of FIGS. 1-6 provides for an exhaust system, comprising: an exhaust manifold having different length runners; and an emission control device housing a plurality of catalyst bricks, at least one of which has with a varying cell density or cell wall thickness.

In some examples, the system of FIGS. 1-6 provides for an exhaust system, comprising: an engine having an integrated exhaust manifold having different length exhaust runners; and an emission control device housing a plurality of catalyst bricks serially positioned, each with a different cell density and cell wall thickness. The exhaust system includes wherein the emission control device is in a close-coupled position, and wherein the exhaust manifold includes exactly three runners, with one longer than a remaining two runner, the one longer runner being positioned at one end of the manifold opposite the remaining two. The exhaust system includes wherein a first catalyst brick has a higher cell density than a second catalyst brick, and wherein the first catalyst brick has a lower cell density than the second catalyst brick. The exhaust system further comprises an oxygen sensor positioned adjacent the one longer runner. The exhaust system further comprises another emission control device positioned downstream of the emission control device.

The system of FIGS. 1-6 also provides for a method of operating an engine, comprising: flowing exhaust gas from a plurality of engine cylinders to an exhaust manifold having different length runners; combining the exhaust flow downstream of the different length runners and upstream of a close-coupled catalyst housing; and flowing the combined exhaust gas through a plurality of catalyst bricks, each with a different cell density housed within the close-coupled catalyst housing, and each with varying cell density along a plurality of directions. The method further comprises sensing exhaust gas oxygen content of the combined exhaust flow upstream of a first brick of the plurality of bricks.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system, comprising:
   an exhaust manifold having different length runners, the runners joining in a mixing area within the exhaust manifold; and
   an emission control device housing a catalyst brick with a varying multi-cell density within the catalyst brick varying across and at a front face of the catalyst brick, cells with higher and lower density each having walls that support a coating of metal catalysts within the catalyst brick,
   wherein a first catalyst brick in a housing has the varying multi-cell density and a second catalyst brick in the housing has a uniform cell density.

2. The exhaust system of claim 1, wherein the emission control device is in a close-coupled position, and wherein the varying multi-cell density is defined as a number of cells per unit of cross-sectional area.

3. The exhaust system of claim 1, further comprising another emission control device positioned downstream of the emission control device, and an exhaust sensor positioned between the emission control devices.

4. The exhaust system of claim 1, wherein an average cell density of a first catalyst brick differs from an average cell density of a second catalyst brick in the housing, and further comprising an exhaust gas sensor positioned between the first and second catalyst bricks.

5. The exhaust system of claim 1, wherein the exhaust manifold includes exactly three runners, with one longer than the remaining two runners, the one longer runner being positioned at one end of the exhaust manifold opposite the remaining two, and wherein an open frontal area of the catalyst brick varies based on the varying multi-cell density.

6. The exhaust system of claim 5, further comprising an oxygen sensor positioned adjacent the one longer runner.

7. An exhaust system, comprising:
   an engine having an integrated exhaust manifold having different length exhaust runners; and
   an emission control device housing a plurality of catalyst bricks serially positioned, with varying cell density within a catalyst brick at a front face of the catalyst brick, cells with higher and lower density each having walls that support a coating of metal catalysts within the catalyst brick at the front face of the catalyst brick,
   wherein the catalyst bricks are positioned linearly within the exhaust system,
   wherein the plurality of catalyst bricks has varying cell density,
   wherein the varying cell density is in a vertical direction, and
   wherein there is a larger variation in cell density within a vertical center region in a first catalyst brick than a second catalyst brick, while there is a larger variation in cell density within a vertical bottom region in the second catalyst brick than the first catalyst brick, wherein the vertical direction is a direction orthogonal to a longitudinal axis of the emission control device.

8. The exhaust system of claim 7, wherein the emission control device is in a close-coupled position, and wherein the exhaust manifold includes exactly three runners, with one longer than the remaining two runners, the one longer runner being positioned at one end of the exhaust manifold opposite the remaining two, and wherein one runner is wider than the remaining two runners.

9. The exhaust system of claim 7, further comprising another emission control device positioned downstream of the emission control device.

10. The exhaust system of claim 7, wherein a first, upstream, brick has varying cell density along only one direction, the one direction being one of horizontal or vertical, wherein the vertical direction is a direction orthogonal to a longitudinal axis of the emission control device, and the horizontal direction is a direction orthogonal to both the longitudinal axis and the vertical direction.

11. The exhaust system of claim 7, wherein a first, upstream, brick has varying cell density along two directions, the two directions being horizontal and vertical, wherein the vertical direction is a direction orthogonal to a longitudinal axis of the emission control device, and the horizontal direction is a direction orthogonal to both the longitudinal axis and the vertical direction.

12. The exhaust system of claim 7, wherein a first catalyst brick has the varying cell density in a first region of the front face of the catalyst brick and a uniform cell density in a second region of the front face of the catalyst brick, and wherein all catalyst bricks in the plurality of catalyst bricks are positioned on a common longitudinal axis.

13. The exhaust system of claim 8, further comprising an oxygen sensor positioned adjacent the one longer runner.

14. An exhaust system, comprising:
   an exhaust manifold having different length runners, the runners joining in a mixing area within the exhaust manifold; and
   an emission control device housing a catalyst brick with a varying multi-cell density within the catalyst brick varying across and at a front face of the catalyst brick, cells with higher and lower density each having walls that support a coating of metal catalysts within the catalyst brick,
   wherein an average cell density of a first catalyst brick differs from an average cell density of a second catalyst brick in a housing, and further comprising an exhaust gas sensor positioned between the first and second catalyst bricks.

15. The exhaust system of claim 14, wherein the emission control device is in a close-coupled position, and wherein the varying multi-cell density is defined as a number of cells per unit of cross-sectional area.

16. The exhaust system of claim 14, wherein a first catalyst brick in the housing has a first varying multi-cell density and a second catalyst brick in the housing has a second, different, varying multi-cell density.

17. The exhaust system of claim 14, further comprising another emission control device positioned downstream of the emission control device, and an exhaust sensor positioned between the emission control devices.

18. The exhaust system of claim 14, wherein the exhaust manifold includes exactly three runners, with one longer than the remaining two runners, the one longer runner being positioned at one end of the exhaust manifold opposite the remaining two, and wherein an open frontal area of the catalyst brick varies based on the varying multi-cell density.

19. The exhaust system of claim 18, further comprising an oxygen sensor positioned adjacent the one longer runner.

* * * * *